United States Patent [19]

Kithil

[11] Patent Number: 5,691,693
[45] Date of Patent: Nov. 25, 1997

[54] IMPAIRED TRANSPORTATION VEHICLE OPERATOR SYSTEM

[75] Inventor: Philip W. Kithil, Santa Fe, N. Mex.

[73] Assignee: Advanced Safety Concepts, Inc., Santa Fe, N. Mex.

[21] Appl. No.: 535,576

[22] Filed: Sep. 28, 1995

[51] Int. Cl.$^6$ ................................................. B60Q 1/00
[52] U.S. Cl. ........................... 340/439; 340/575; 340/576; 180/272
[58] Field of Search ..................... 340/439, 438, 340/437, 575–76; 364/424.04; 180/272

[56] References Cited

U.S. PATENT DOCUMENTS

| | | | |
|---|---|---|---|
| 3,898,472 | 8/1975 | Long | 180/270 |
| 3,903,514 | 9/1975 | Mazzola | 340/575 |
| 4,177,460 | 12/1979 | Hoinski et al. | 340/575 |
| 4,354,179 | 10/1982 | Fourcade | 340/575 |
| 4,796,013 | 1/1989 | Yasuda et al. | 340/562 |
| 4,836,219 | 6/1989 | Hobson et al. | 128/782 |
| 4,887,024 | 12/1989 | Sugiyama et al. | 324/674 |
| 5,071,160 | 12/1991 | White et al. | 280/735 |
| 5,166,679 | 11/1992 | Vranish et al. | 340/870.37 |
| 5,281,921 | 1/1994 | Novak et al. | 324/671 |
| 5,311,877 | 5/1994 | Kishi | 128/732 |
| 5,330,226 | 7/1994 | Gentry et al. | 280/735 |
| 5,353,013 | 10/1994 | Estrada | 340/575 |
| 5,398,185 | 3/1995 | Omura | 364/424.05 |
| 5,413,378 | 5/1995 | Steffens, Jr. et al. | 280/735 |
| 5,465,079 | 11/1995 | Bouchard et al. | 340/576 |
| 5,488,354 | 1/1996 | Colvin | 340/575 |
| 5,522,092 | 6/1996 | Streb et al. | 340/575 |

OTHER PUBLICATIONS

Novak & Fedeme, "A Capacitive–Based Proximity Sensor For Whole ARM Obstacle Avoidance," Proc'ings, 1992 IEEE Conf., pp. 1307–1311.

Smythe, "Static & Dynamic Electricity" (1950), p. 38.

Fakhar et al, "Effect of Sound & Vibration on Vigilance", Laboratoire Energie Nuisances (LEN) (France), INRETS No. 153, 1992, at 90–92 (Translation).

*Primary Examiner*—Jeffery Hofsass
*Assistant Examiner*—Ashok Mannava
*Attorney, Agent, or Firm*—Robert W. Harris

[57] ABSTRACT

A system for detecting impairment of operating ability of transportation vehicle operators due to sleepiness, intoxication or other causes, and for sounding an alarm when operator impairment is found. The invention employs an array of at least three dual electrode capacitive coupling sensors, placed in the headliner above the operator's seat, which sense operator head position and motion. Outputs from the sensors, after suitable processing and amplification, are analyzed by a microprocessor to determine the operator's head position and motion, through triangulation analysis of distances from the operator's head to each sensor. The microprocessor records, tracks and compares the operator head motion data to profiles of normal head motion and impaired head motion, to detect any head motion indicative of operator impairment. When operator impairment is thus determined, the microprocessor activates any of a variety of warning devices, to warn and alert the operator and possibly also operators of other nearby vehicles, that there is a state of operator impairment.

19 Claims, 2 Drawing Sheets

5,691,693

IMPAIRED TRANSPORTATION VEHICLE OPERATOR SYSTEM

BACKGROUND OF THE INVENTION

The invention pertains to systems for detecting impairment of the operating ability of transportation vehicle operators, especially motor vehicle operators, and for altering the operator, and possibly also operators of nearby vehicles, when a state of operator impairment is detected.

It is well known that a great many serious injuries and fatalities are caused each year by motor vehicle accidents resulting from impairment of driving ability of the vehicle operator, which may arise from a number of different causes. Many such accidents are caused when operators have driven too long without sleep, and begin to fall asleep at the wheel, often without realizing their state of impairment. Even if the operator does not actually fall completely asleep, the operator in the sleepy state will have substantially impaired alertness and reflexes, and may be unable to respond in time to some hazard encountered in traffic.

Or an operator may have consumed alcoholic beverage, and may have reached a greater state of intoxication, than he or she realizes. Such partial intoxication, besides substantially dulling the reflexes, can also make the operator sleepy and generally less alert to the requirements of proper driving in traffic.

There are a variety of other physical conditions which may cause an operator to become too sleepy to safely operate the vehicle. Narcolepsy, for example may cause an operator to suddenly fall asleep, without warning. Sometimes an operator may suddenly become too sleepy, or insufficiently alert, as a result of the effects of aging.

In many instances an early sign of imminent serious operator impairment, is a change in inclination of the head, which will be different in nature from normal head inclinations that occur during driving. Fakhar et al, "Effect of Sound and Vibration on Vigilance", Laboratoire Energie Nuisances (LEN) (France), INRETS No. 153, 1992, at 90–92.

Research has confirmed this correlation between change in head inclination and reduced attentiveness. This is attributed to physiological changes in muscle tone, resulting in a progressive change in head and neck alignment, culminating in "nodding off". The time profile of this change in head inclination is different than normal head motion of an alert operator.

There is thus a need for a system which can reliably and automatically sense change in operator head position and motion over time, and can compare the time profile of the operator head motion with various profiles of normal and impaired operator head motion, and thus automatically detect a state of substantial operator impairment, and which can, upon detecting such an impaired operator state, activate one or more alarm devices, to alert the operator, and possibly also operators of nearby vehicles, to the fact that the operator is impaired. And there is a need for a system which can accomplish these objectives independently of variations in operator head positions resulting from variations in operator height.

The present invention accomplishes these objectives by the general approach of electronic detection and analysis of operator head motion, using an array of capacitive coupling sensors above the operator, and a microprocessor to analyze amplified signals from the sensors, to obtain a continuous record of operator head motion, for comparison with various profiles stored in the memory of the microprocessor; the microprocessor activates the warning device or devices when the impaired operator condition is detected.

SUMMARY OF THE INVENTION

The invention employs a capacitive coupling sensing system, having an array of at least three dual adjacent electrode capacitive coupling sensors, placed in the headliner above the operator's seat, with all sensors driven by a single oscillator, which sensors are used to sense operator head position and motion. The signal from each sensor is affected by presence and proximity of the operator's head which changes the capacitive coupling existing between the adjacent electrodes. Each sensor consists of a multilayer printed circuit board, or series of overlaid boards. The signals from the sensors are fed through an electronic signal processor containing a plurality of amplifiers of varying gain, to optimize sensitivity for each of at least two ranges of distance from the sensor array to the operator's head, a low gain amplifier being used for the near range, tall operator case, and a high gain amplifier being used for the far range, short operator case. Outputs from the sensors, after processing and amplification, are converted by an analog to digital converter ("ADC") and analyzed by a microprocessor to determine the operator's head position and motion, through triangulation analysis of distances from the operator's head to each sensor. The microprocessor records, tracks and compares the operator head motion data to stored profiles of normal head motion and impaired head motion, to detect any head motion indicative of operator impairment. When operator impairment is thus determined, the microprocessor activates any of a variety of warning devices, to warn and alert the operator and possibly also operators of other nearby vehicles, that there is a state of operator impairment, so as to hopefully wake up the operator, in cases of impairment by sleepiness.

DESCRIPTION OF THE PREFERRED EMBODIMENT

Figure 1:
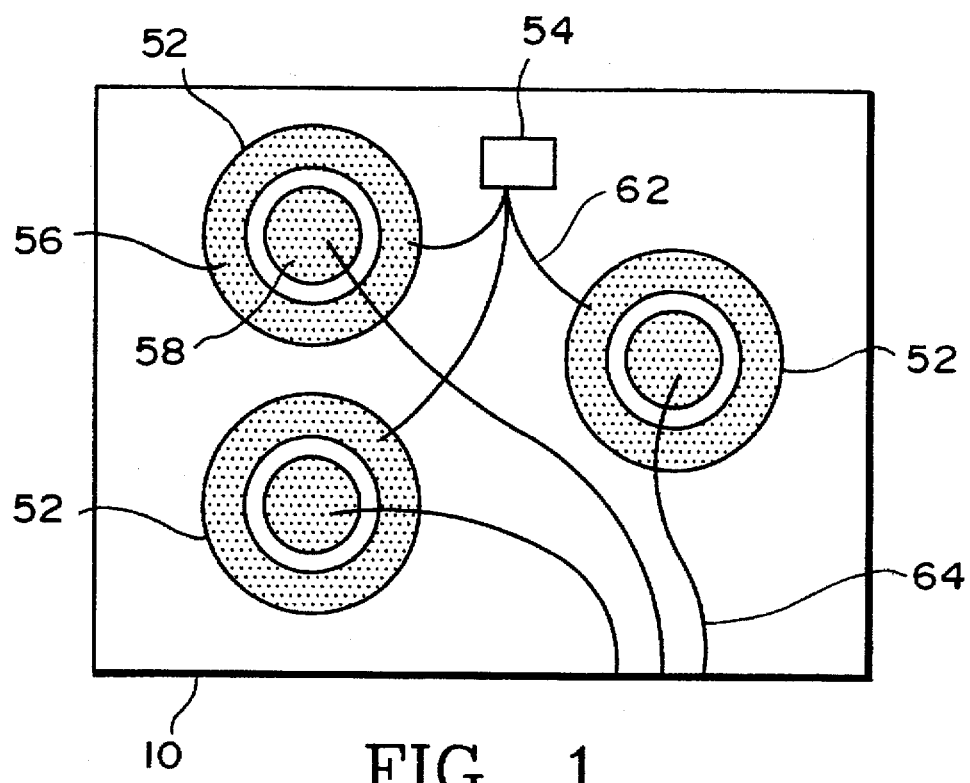
FIG. 1 is plan view of the array of three capacitive coupling proximity sensors.
Figure 2:
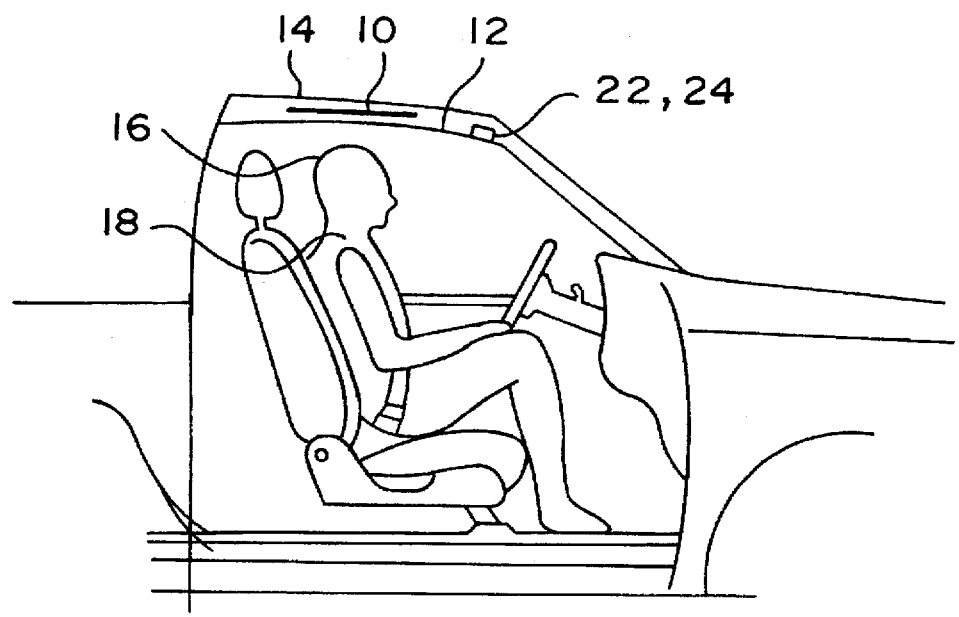
FIG. 2 is a side elevational view of the configuration of the preferred embodiment, partially in section, in an automobile.

Referring now to the drawings, in which like reference numbers denote like or corresponding elements, the principal components of the apparatus are an array of three capacitive coupling sensors 10, each mounted on the top side of the headliner 12 which is secured beneath the vehicle roof 14 above the head 16 of operator 18; signal processing circuitry 20 to filter the signals and extract changes in signal levels; a low gain amplifier 22 and a high gain amplifier 24, which each receive and amplify output signals from signal processing circuitry 20, conveyed to said amplifiers by wires 26 and 28; an analog to digital converter (ADC) 30 which may be separate from or part of a microprocessor 32; a microprocessor 32, further described below, having means for analysis of said output signals, after amplification and ADC conversion, which receives the amplified output signals of sensors 10 from said amplifiers via wires 34 and 36, and having means for activation of an alarm means, upon detection of an impaired operator condition; and an alarm 38, connected to said microprocessor 32 by a wire 40, for alerting said operator when it is determined that said operator is impaired in driving ability.

The signal processing circuitry 20 contains conventional bandpass filters 42, conventional full wave rectifiers 44, conventional peak detectors 46, and conventional differential amplifiers 48, connected in series. The signal processing circuitry 20, the low gain amplifier 22, high gain amplifier 24, ADC 30, microprocessor 32, and alarm 38, together constitute a signal processing, analysis and alarm activation means 50, as further detailed below.

Each of the sensors 10 consists of both a detector 52, and a driving oscillator 54, which activates one electrode of the detector 52. In the preferred embodiment the same oscillator 54 is used to drive one electrode on each of the detectors 52. Each detector 52 consists of at least two electrodes 56 and 58 on one side of a printed circuit board 60, with oscillator 54 being connected to electrode 56 by a wire 62, and with electrode 58 being connected to signal processing, analysis and alarm activation means 50, by wire 64. Each detector may have a series of overlaid circuit boards, often known as "mother-daughter boards". The sensors 10 each function by creating an electrostatic field between electrodes 56 and 58, which field is generated by charge moving to electrode 56 from oscillator 54, and which field is affected by presence of a person's head near by, as a result of capacitive coupling, due to the fact that the human body has conductivity and a dielectric constant different from those of air. Thus there is a change in the capacitance between electrodes 56 and 58, caused by the presence of a person's head nearby. As is well known in the electronic arts, such a capacitive coupling effect will be dependent on the distance from the person's head to detector 52. The measured capacitance change may thus be used to determine the distance of the person's head from detector 52.

Figure 3:
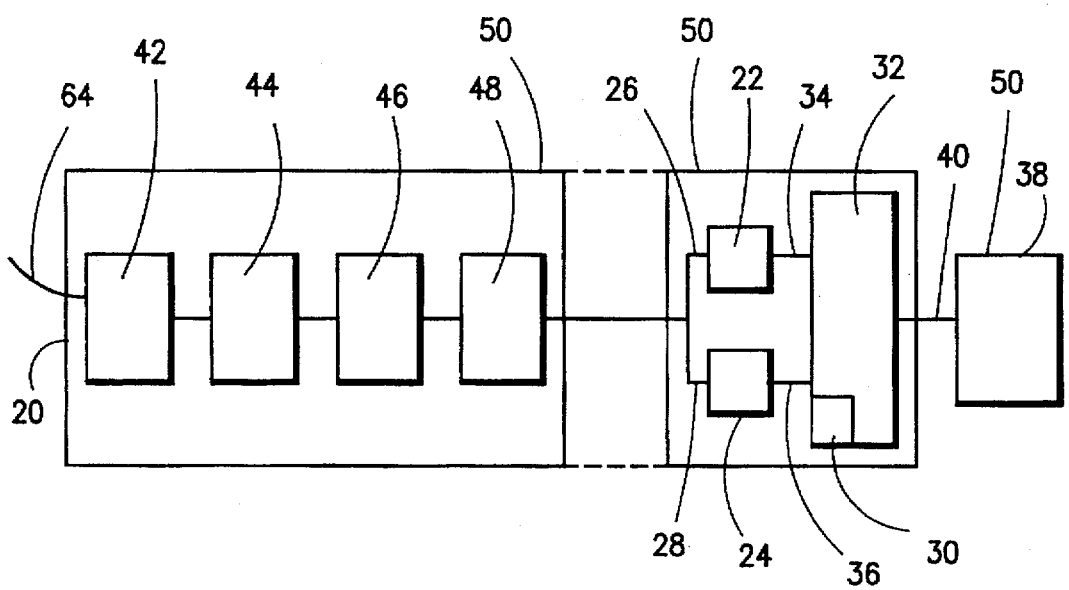
FIG. 3 is a schematic view of the signal processing circuitry, and the signal processing, analysis and alarm activation means circuitry, of the preferred embodiment.
Figure 4:
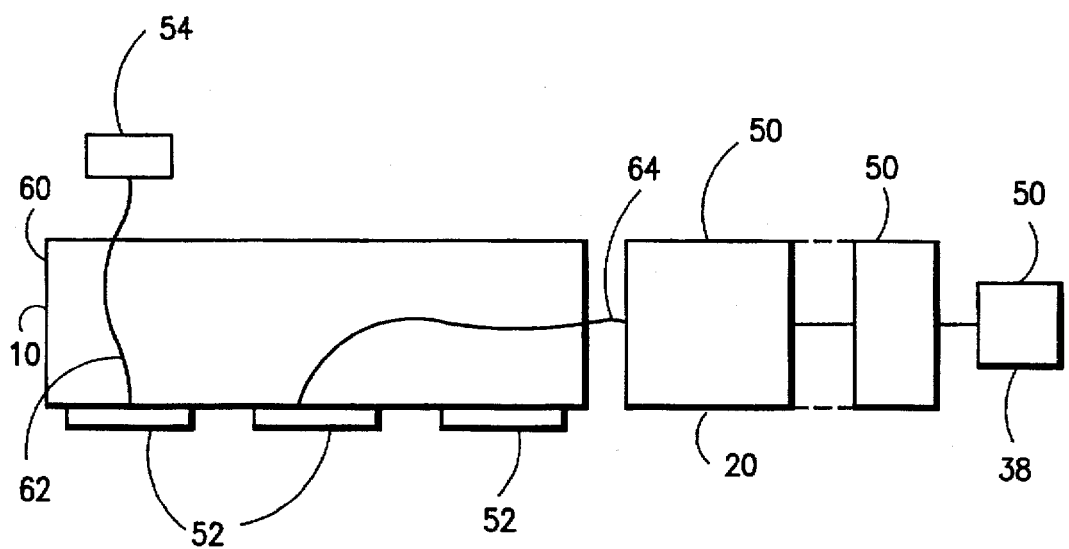
FIG. 4 is a side elevational schematic illustration of the connection of the sensor array and the signal processing, analysis and alarm activation means circuitry, of the preferred embodiment.

With regard to the signal processing, analysis and alarm activation means 50, in the preferred embodiment the same microprocessor 32 and ADC 30, are used for the entire system, that is for dealing with the signals from all three of the sensors 10; and a single alarm 38 is used for the entire system. The ADC 30 has three analog channel inputs which are multiplexed. However, each of the signals from each of the detectors 52 proceeds toward microprocessor 32 through its own circuit of the form shown in FIG. 3, with its own bandpass filter 42, full wave rectifier 44, peak detector 46, differential amplifier 48, low gain amplifier 22, and high gain amplifier 24, so that the microprocessor 32 may deal with appropriately processed and amplified signals from each of the detectors 52, and analyze them separately for purposes of triangulation analysis to determine operator head position.

The signals from the sensors 10 will be particularly sensitive to operator head position and head motion, as opposed to other parts of the operator's body, since the head is closest to the overhead position sensors 10. The oscillator 54 is operated at a frequency sufficient to obtain a sampling rate of 100 Hz to 1 KHz, which is believed adequate to distinguish normal vs. impaired head motion. The sampling rate may be determined by means contained within microprocessor 32, such as a conventional analog digital converter circuit.

The use of a dual electrode form of detector 52, is believed to offer an advantage over the so-called driven shield form of capacitive coupling sensor, such as that disclosed in U.S. Pat. No. 5,166,679, namely less susceptibility to stray capacitance effects, since the measured capacitance is between adjacent electrodes, rather than between one electrode and ground; since the adjacent electrodes are subject to essentially the same stray capacitance effects, the dual electrode configuration tends to null out stray capacitance effects, since the measured capacitance between electrode 56 and electrode 58 is, by definition, the ratio of the charge stored on the two electrodes to the voltage difference between them. It is also believed by applicant that the dual electrode configuration can provide improved range, up to 36" in some applications.

The purpose of having both the low gain amplifier 22 and the high gain amplifier 24, is to achieve two ranges of sensitivity, corresponding to two ranges of distance from the operator's head 16 to the sensors 10, i.e. the near range case for taller operators, whose heads 16 will be closer to the sensors 10 and the far range case for shorter operators. The low gain amplifier 22 produces output signals more useful for the near range, taller operator case, and the high gain amplifier 24 produces signals more useful for the far range, shorter operator case.

The microprocessor 32 has several distinct software and data base elements, to accomplish the objectives of the system. The microprocessor 32 contains software capable of performing triangulation analysis of the signals indicating distance from head 16 of operator 18 to each of the three detectors 52 of the three sensor array, so that the microprocessor 32 continuously monitors the position of head 16.

The microprocessor 32 contains a reference memory, having typical time profiles of operator head motion for normal head motion, such as the periodic side to side head motion that occurs when the operator glances toward both side streets when about to transit an intersection, or the side glances that an operator may give his passenger during conversation, or the sudden, rather violent forward head motion that occurs during a sneeze. The reference memory also contains various typical time profiles for impaired operator head motion, such as the forward nodding head motion of an operator who is becoming too sleepy to drive safely. Such profiles can be measured using the apparatus of the present invention, and measuring profiles for operators operating driving simulators, who have been given sleep inducing medication, or have simply stayed awake long enough to become excessively sleepy, or have consumed sufficient alcohol to become intoxicated.

The microprocessor 32 also contains an active memory for storing the actual, currently measured time profile of the operator's head motion.

The microprocessor 32 has a comparison software subroutine, for comparing the actual time profile of the operator's head motion, with the normal and impaired reference profiles stored in the reference memory, and for determining, based on that comparison, whether there is a significant impairment of the operator's driving ability.

And the microprocessor 32 also has an activation software subroutine, to activate the alarm 38, when it is determined that significant operator impairment exists.

The alarm 38 may take any of a variety of forms. The activation software subroutine of the microprocessor 32 may be connected to the dome light or a special warning light on the dash, so as to cause the light to repeatedly flash on and off, to alert the operator 18, that an impairment determination has been made. The activation software subroutine may also be connected to the emergency vehicle flasher lights, so as to activate these lights, to warn nearby vehicle operators that a hazard condition exists. Or the activation software subroutine could be connected to a recording and loudspeaker within the passenger compartment, which may play a message containing the operator's name and the command "WAKE UP!" The activation software subroutine might instead or in addition be connected to the vehicle horn, so as to cause the horn to honk repeatedly, to alert both the operator 18 and other operators nearby in traffic. An audible alarm of some sort offers the advantage over a merely visible alarm, such as a flashing light, that the operator 18 will not see the flashing light if his/her eyes have closed.

Those familiar with the art will appreciate that the invention may be employed in configurations other than the specific forms disclosed herein, without departing from the essential substance thereof.

For example, and not by way of limitation, although three sensors 10 are used in the preferred embodiment, a number believed sufficient to achieve adequate sensitivity for measurement of operator head motion, the present invention could be employed with different numbers of sensors, provided at least three are used, to allow triangulation.

Although capacitive coupling sensors are used in the preferred embodiment, the present invention is not to be regarded as being limited to the use of this particular form of sensor.

Similarly, although two amplifiers are used in the preferred embodiment, to amplify the signals from the sensors 10, for the reasons given above, the invention is not to be regarded as being limited to the use of two amplifiers; a single amplifier, or three or more amplifiers of varying sensitivity, might be suitable for particular applications.

And, although the preferred embodiment is described as using "wires" to connect various circuit components, the present invention is not to be understood as being limited to forms in which "wires" in the ordinary sense of the word are used, i.e. insulated covered bundles of metal strands. Circuit components may instead be connected and communicate with one another by numerous other means, including, without limitation, conductive traces on circuit boards, or infrared beams, or fiber optic connectors, without departing from the substance of the invention. So the term "wire" is to be understood as referring to a connection means, for connecting different circuit components.

Also, while the preferred embodiment uses a microprocessor for processing various input/output signals and processing information, another form of information processing means such as customized digital logic, neural networks, or other forms of integrated circuits for processing and decision-making, could be employed instead.

And while the preferred embodiment uses a single oscillator frequency for all detectors, another form of the invention could use multiple oscillators operating over a range of frequencies to drive the detectors.

In addition, while the preferred embodiment is designed to detect impairment, and activate alarm means to alert an impaired operator, other forms of the invention could activate other responses to the impairment, such as disengagement of the vehicle power train, or send notification of the operator's impairment to remotely located monitoring systems or personnel; or could include other mechanisms to reduce potential harm to persons or property that might result from the impaired condition.

The scope of the invention is defined by the following claims, including also all subject matter encompassed by the doctrine of equivalents as applicable to the claims.

I claim:

1. Impaired operator detection and warning apparatus, for detecting significant impairment of the operating ability of a transportation vehicle operator, by measurement and analysis of the motion of said operator's head, and for warning of said impairment, comprising:
   (a) Sensing means, for sensing the position of said operator's head, and for producing electrical output signals dependent upon said position of said operator's head;
   (b) Signal processing, analysis, and alarm activation means, connected to said sensing means, for achieving any needed amplification of said output signals, for any height of said operator within an expected ranges of heights for said operator, and for determining the time profile of the motion of said operator's head by analysis of said output signals, and for comparing said time profile of said motion of said operator's head, with reference profiles characteristic of normal and impaired operator head motion, and for activation of an alarm means, upon a determination, based upon said comparison of said profiles, that said operator is significantly impaired in operating ability; and
   (c) said alarm means, connected to said signal processing, analysis and alarm activation means, for alerting said operator to said determination that said operator is significantly impaired.

2. The apparatus of claim 1, wherein said sensing means comprises a plurality of capacitive coupling sensors, and wherein each of said sensors comprises a capacitive coupling detector driven by a driving means, connected to said detector, for electrically driving said detector.

3. The apparatus of claim 2, wherein said capacitive coupling sensors are mounted on the upper surface of a headliner secured to the interior roof of said vehicle above said operator's head.

4. The apparatus of claim 3, wherein said sensing means comprises an array of at least three of said capacitive coupling sensors.

5. The apparatus of claim 1, wherein said signal processing, analysis and alarm activation means includes a plurality of amplifiers of different gains, having gains of suitable values to produce said output signals of suitable amplitudes, for the expected range of heights for said operators who may operate said vehicle.

6. The apparatus of claim 5, wherein said signal processing, analysis and alarm activation means includes two amplifiers.

7. The apparatus of claim 1, wherein said signal processing, analysis and alarm activation means includes a microprocessor, having software means to analyze said output signals from said sensing means and to continuously determine the position of said operator's head, and having an active memory means to store the measured time profile of said operator's head positions at different times, and having a reference memory means containing reference time profiles showing typical operator head motion profiles for normal and impaired operators, and wherein said software means further includes profile comparison means, to compare said measured time profiles of said operator's head positions at different times, with said reference time profiles, and to determine, based upon said comparison, whether said operator is significantly impaired in operating ability, and wherein said microprocessor further comprises said alarm activation means, to activate said alarm means when said determination of operator impairment is made.

8. The apparatus of claim 1, wherein said alarm means comprises at least one bright light in the interior of said vehicle, and a means to cause said bright light to repeatedly flash on and off.

9. The apparatus of claim 1, wherein said alarm means is a means to cause repeated honking of a horn of said vehicle.

10. The apparatus of claim 1, wherein said alarm means includes means to cause repeated flashing of emergency flasher lights of said vehicle.

11. The apparatus of claim 2, wherein each of said detectors has two electrodes, and wherein said driving means is an oscillator connected to one of said electrodes, and wherein said signal processing, analysis and alarm activation means is connected to the other of said electrodes.

12. The apparatus of claim 11, wherein a single oscillator drives all of said sensors.

13. The apparatus of claim 1, wherein said alarm means is a means to play a recorded message calling out said operator's name, and commanding said operator to wake up.

14. Method of dealing with an impaired operator condition, for an operator of a transportation vehicle, comprising the steps of:
   (a) Continuously sensing and recording the position of said operator's head;
   (b) Comparing the time profile of motion of said operator's head, with reference time profiles of normal and impaired operator head motion;
   (c) Determining, based upon said comparison, when said operator is significantly impaired in operating ability; and
   (d) Alerting said operator to said determination that said operator is significantly impaired.

15. Impaired operator detection and damage prevention apparatus, for detecting significant impairment of the operating ability of a transportation vehicle operator, by measurement and analysis of the motion of said operator's head, and for prevention of damage to persons or property resulting from said impairment, comprising:
   (a) Sensing means, for sensing the position of said operator's head, and for producing electrical output signals dependent upon said position of said operator's head;
   (b) Signal processing, analysis, and alarm activation means, connected to said sensing means, for achieving any needed amplification of said output signals, for any height of said operator within an expected ranges of heights for said operator, and for determining the time profile of the motion of said operator's head by analysis of said output signals, and for comparing said time profile of said motion of said operator's head, with reference profiles characteristic of normal and impaired operator head motion, and for activation of a vehicle stopping means, upon a determination, based upon said comparison of said profiles, that said operator is significantly impaired in operating ability; and
   (c) Said vehicle stopping means, connected to said signal processing, analysis and alarm activation means, for causing said vehicle to come to a gradual, safe stop upon said determination that said operator is significantly impaired in operating ability.

16. Impaired operator detection and warning apparatus, for detecting significant impairment of the operating ability of a transportation vehicle operator, by measurement and analysis of the motion of said operator's head, and for warning of said impairment at a location remote from said vehicle, comprising:
   (a) Sensing means, for sensing the position of said operator's head, and for producing electrical output signals dependent upon said position of said operator's head;
   (b) Signal processing, analysis, and alarm activation means, connected to said sensing means, for achieving any needed amplification of said output signals, for any height of said operator within an expected ranges of heights for said operator, and for determining the time profile of the motion of said operator's head by analysis of said output signals, and for comparing said time profile of said motion of said operator's head, with reference profiles characteristic of normal and impaired operator head motion, and for activation of an alarm means, upon a determination, based upon said comparison of said profiles, that said operator is significantly impaired in operating ability; and
   (c) Said alarm means, connected to said signal processing, analysis and alarm activation means, for providing notification, at a location remote from said vehicle, of said determination that said operator is significantly impaired.

17. Impaired operator detection and warning apparatus, for detecting significant impairment of the operating ability of a transportation vehicle operator, by measurement and analysis of the motion of said operator's head, and for warning of said impairment, comprising:
   (a) Sensing means, for sensing the position of said operator's head, and for producing electrical output signals dependent upon said position of said operator's head;
   (b) Signal processing, analysis, and alarm activation means, connected to said sensing means, for achieving any needed amplification of said output signals, for any height of said operator within an expected ranges of heights for said operator, and for determining the time profile of the motion of said operator's head by analysis of said output signals, and for comparing said time profile of said motion of said operator's head, with reference profiles characteristic of normal and impaired operator head motion, and for activation of an alarm means, upon a determination, based upon said comparison of said profiles, that said operator is significantly impaired in operating ability; and
   (c) Said alarm means, connected to said signal processing, analysis and alarm activation means, for alerting persons other than said operator to said determination that said operator is significantly impaired.

18. The apparatus of claim 17, wherein said alarm means includes means to cause repeated flashing of emergency flasher lights of said vehicle.

19. Method of dealing with an impaired operator condition, for an operator of a transportation vehicle, comprising the steps of:
   (a) Continuously sensing and recording the position of said operator's head;
   (b) Comparing the time profile of motion of said operator's head, with reference time profiles of normal and impaired operator head motion;
   (c) Determining, based upon said comparison, when said operator is significantly impaired in operating ability; and
   (d) Alerting persons other than said operator to said determination that said operator is significantly impaired.

* * * * *